US007672989B2

(12) United States Patent
Dror et al.

(10) Patent No.: US 7,672,989 B2
(45) Date of Patent: Mar. 2, 2010

(54) LARGE NUMBER MULTIPLICATION METHOD AND DEVICE

(75) Inventors: Itai Dror, Omer (IL); Boris Dolgunov, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 968 days.

(21) Appl. No.: 11/429,190

(22) Filed: May 8, 2006

(65) Prior Publication Data
US 2006/0253522 A1 Nov. 9, 2006

Related U.S. Application Data

(60) Provisional application No. 60/678,907, filed on May 9, 2005.

(51) Int. Cl.
*G06F 7/523* (2006.01)
(52) U.S. Cl. .................................................. 708/625
(58) Field of Classification Search ............. None
See application file for complete search history.

(56) References Cited

U.S. PATENT DOCUMENTS

| 6,014,684 | A | * | 1/2000 | Hoffman | 708/620 |
| 6,026,483 | A | * | 2/2000 | Oberman et al. | 712/221 |
| 6,029,184 | A |   | 2/2000 | He | |
| 6,038,583 | A | * | 3/2000 | Oberman et al. | 708/628 |
| 6,144,980 | A | * | 11/2000 | Oberman | 708/627 |
| 6,370,559 | B1 | * | 4/2002 | Hoffman | 708/625 |
| 6,393,554 | B1 | * | 5/2002 | Oberman et al. | 712/221 |
| 6,708,193 | B1 | * | 3/2004 | Zeng | 708/625 |
| 2003/0105793 | A1 | * | 6/2003 | Guttag et al. | 708/625 |

FOREIGN PATENT DOCUMENTS

| JP | 60-229140 | 11/1985 |
| JP | 04-367932 | 12/1998 |

OTHER PUBLICATIONS

International Search Report and Written Opinion for PCT/IL06/00551, Jan. 26, 2007, 4 pages.
Dusse S.R. et al.: "A Cryptographic Library for the Motorola DSP56000," Lecture Notes in Computer Science, Advances in Cryptology - EUROCRYPT '90, May 21-24 1990, Aarhus, DK (1991) Berlin, DE (pp. 230-244).
Extended European Search Report for EP 06 72 8340, mailed from the European Patent Office on Nov. 16, 2009, 6 pages.

* cited by examiner

*Primary Examiner*—David H Malzahn
(74) *Attorney, Agent, or Firm*—Brinks Hofer Gilson & Lione

(57) ABSTRACT

A signed multiplication method and a corresponding device for multiplying a first multiplicand with a second multiplicand. The device stores the first multiplicand in a first register as a first vector of at least one respective digit and storing the second multiplicand in a second register as a second vector of at least one respective digit, each digit having a pre-determined number of bits. The method further converts the digits of the first vector and the second vector to corresponding digits of one bit less each than the pre-determined number of bits. A processor effects signed multiplication of the multiplicands.

9 Claims, 5 Drawing Sheets

US 7,672,989 B2

LARGE NUMBER MULTIPLICATION METHOD AND DEVICE

CROSS-REFERENCE TO RELATED APPLICATIONS

This patent application claims the benefit of U.S. Provisional Patent Application No. 60/678,907, filed May 9, 2005.

FIELD OF THE INVENTION

The present invention relates to the field of multiplication of large numbers. More particularly, the present invention relates to a method and device providing multiplication of large numbers using signed arithmetic only.

BACKGROUND OF THE INVENTION

Large-number multiplication is used in numerous computer algorithms known in the art. Common uses of large-number arithmetic include public key cryptography and Montgomery multiplication, where numerous multiplication operations of very large numbers (with an order of a thousand bits each) are implemented.

A "large number" is an integer number of N bits used by a processor with registers or word sizes of W bits in width, where N>2×W. The term "word size" refers to the number of bits in a single precision register, or the memory width of the processor in use. Common processors with a word size of W bits are capable of multiplying two words of W bits and then storing the result in a double-width register of 2×W bits. If the size of the operand to be multiplied is larger then W bits, a dedicated multiplication algorithm is required.

FIG. 1 is a demonstration of a prior art multiplication procedure 10 for multiplying two multiple-digit numbers using pen and paper. Each number is composed of two hexadecimal digits. The first number is 3B (indicated by reference numeral 12) and the second number is CA (indicated by reference numeral 14). The multiplication procedure 10 starts with multiplying only the Least Significant Digit (LSD) of the second number 14 with the two digits of the first number 12 to create a first interim result. The first interim result is indicated by reference numeral 16.

Next, a similar operation is performed with multiplying the Most Significant Digit (MSD) of the second number 14 with the two digits of the first number 12 to create a second interim result. The second interim result, indicated by reference numeral 18, is written below the first interim result 16 shifted one digit to the left.

After the multiplication procedure 10 is completed, the sum of the first interim result 16 and the second interim results 18 is the multiplication result 2E8E (indicated by reference numeral 20).

Multiplying hexadecimal numbers as shown herein is used for clarity only. Computer algorithms known in the art apply multiplication on binary numbers.

FIG. 2 is a flow chart of a prior art computerized multiplication algorithm 30 applied for the multiplication of the two multiple-word numbers of FIG. 1. When using a computer, each numeral digit is represented by a W-bit computer word. The term digit refers to a portion of a large number that is the size of a computer word.

In general, the computerized multiplication algorithm 30 is applied in a similar manner to the prior art procedure 10 (see FIG. 1). However, according to the computerized multiplication algorithm—the result of each interim multiplication is added to a result vector as the multiplication algorithm proceeds, while according to the multiplication procedure 10 of FIG. 1—the partial results are stored separately before they are summed up at the final stage.

At the initial step 32, two multiplicand vectors X and Y and a result vector Z for holding the result are provided. Vectors X, Y and Z are of W-bit words. The lengths of input vectors X and Y are max_x and max_y, respectively. A double-width register r (composed of 2×W bits) is used to temporarily hold the multiplication result.

At step 34, the result vector Z is cleared.

At step 36, the internal variables i, j, c1, and c2 of the two multiplicand vectors X and Y are cleared, wherein i is the first number digit index, j is the second number digit index, c1 is the high word from the previous multiplication operation, and c2 is the carry from the previous addition operation.

The following steps 38, 40, 42, 44, 46, and 48 comprise the main multiplication loop. At step 38, two digits are multiplied, adding the previous multiplication high word c1, and the carry from the previous addition operation c2. The result is temporarily stored in the double-width register r.

At step 40, the result r of the high-word multiplication is stored in c1.

At the next step 42, the addition carry is calculated and stored in c2.

At step 44, the result vector element $z_{i+j}$ is updated by adding to it the multiplication result. Since the width of each result vector element is W, only the lower word of r is added to element $z_{i+j}$.

At step 46, the X multiplicand index i is incremented.

At the next step 48, it is determined whether the value of i is greater than the length of input vector X. In the affirmative case, the computerized multiplication algorithm proceeds to step 50. However, in the negative case, the computerized multiplication algorithm returns to step 38 and repeats the main multiplication loop.

At step 50, the next result word is updated by adding to it the values of c1 and c2.

At step 52, the second multiplicand index j is incremented, and the internal variables i, c1, and c2 are cleared.

At the next step 54, it is determined whether the internal variable j is greater than the length of input vector Y. In the affirmative case (i.e. after performing max_x times max_y multiplication operations), the computerized multiplication algorithm is terminated at step 56 and the result vector Z holds the final multiplication result. However in the negative case, the computerized multiplication algorithm restates the internal loop from step 38 by multiplying the first multiplicand with the next word of the second multiplicand.

The prior art computerized multiplication algorithm provides multiplication of large numbers, which are based on unsigned multiplication operations. In other words, the input vectors X, Y, as well as the result vector Z all contain positive numbers of W bits per digit (there is no sign bit).

However, several Digital Signal Processors (DSPs) known in the art have arithmetic support for signed operations only. An example of a prior art DSP that does not support unsigned arithmetic (i.e. is limited to signed arithmetic only) is the ZSP200 DSP for example, available from LSI Logic Corporation.

In such types of DSPs, the Most Significant Bit (MSB) in each word is always the sign bit. Using the prior art computerized multiplication algorithm previously described as is and performing signed multiplication operations generates an incorrect result. For example, if the word size is eight bits (W=8), the result of an unsigned multiplication operation of the numbers 0xFF×0xFF is 0xFE01 (255×255 is 65,025). If only signed operations are supported, then the number 255 stands for −1. The multiplication operation of the numbers −1×−1 has a result of +1, which is different from the result that was generated using an unsigned operation.

Compilers used with processors known in the art that are capable of performing signed operations only solve the problem described above by performing a sequence of operations that translate the signed multiplication result into an unsigned result.

A conversion process known in the art is typically performed as follows:

DEFINITIONS

W is the number of bits in a register, or the memory width.

A and B are the multiplicands. Each multiplicand is W bits long.

r is a double-width variable (2×W bits) used to store the result of an unsigned A×B operation.

$r_s$ is a signed multiplication product (2×W bits) of the two multiplicands A and B.

If the MSB of A is 1 (A is considered to be a negative number), then ~A is defined as the two's complement of A. Note that 0−~A=A.

When performing a signed multiplication operation A×B, where A is a negative number (whose MSB is 1), A is defined as $A=2^W-\sim A$. Multiplying this number by B results in $r=(2^W-(\sim A))\times B=2^W\times B+-(\sim A\times B)=2^W\times B+r_s$.

Hence, in order to perform an unsigned multiplication operation of a negative number A by a positive number B, there can be performed a signed multiplication operation of A and B, and then the value of $B\times 2^W$ can be added to the result. Note that the process of multiplying $B\times 2^W$ is the same as shifting B by W bits to the left ($B\times 2^W$=B<<W). Similarly, if both multiplicands A and B are negative, the result is $r=2^W\times A+2^W\times B+r_s$ or r=(A<<W)+(B<<W)+$r_s$.

In conclusion, a common prior art processor that implements unsigned multiplication with a signed-only arithmetic unit performs the following operations:

(1) Performs signed multiplication of the multiplicands A and B, and (2) Tests each multiplicand (A and B) sign bit. If a multiplicand is negative, then shift the other multiplicand W bits to the left and add the shifted other multiplicand to the result of the signed multiplication operation.

Since the probability of a number being negative is 50%, on average an existing processor must perform one shift of a double-sized number and one addition of a double-sized number per multiplication operation. Such a processor must also test each multiplicand to determine if it is positive or negative.

These extra arithmetic operations significantly reduce the multiplication performance of a signed-only processor in comparison to a processor capable of performing unsigned multiplication. When using a DSP, the situation becomes even worse. Since DSPs are capable of performing multiplication and addition in a single operation, the need to perform the extra arithmetic operations as described above do not utilize the single operation advantage of the multiply and add instruction of the DSP.

There is thus a widely recognized need for, and it would be highly advantageous to have, a device and method performing efficient large-number multiplication using a processor that is limited to signed arithmetic, while overcoming the disadvantages of existing techniques.

SUMMARY OF THE INVENTION

Accordingly, it is a principal object of the present invention to overcome the disadvantages of prior art techniques by introducing a device and method performing efficient large-number multiplication using a processor that is limited to signed arithmetic.

In accordance with the present invention, there is provided an unsigned multiplication method for multiplying a first multiplicand with a second multiplicand, the method including: (a) storing in a first register the first multiplicand as a first vector of at least one respective digit, each digit having a pre-determined number of bits; (b) storing in a second register the second multiplicand as a second vector of at least one respective digit, each digit having pre-determined number of bits; (c) converting digits of the first vector to corresponding digits of one bit less than the pre-determined number of bits each; (d) converting the digits of the second vector to corresponding digits of one bit less than the pre-determined number of bits each; and (e) generating a signed multiplication result, using a processor, all of whose multiplications are limited to signed multiplication, by steps including multiplying each digit that correspond to the first multiplicand by each digit that correspond to the second multiplicand.

Preferably, the generating step includes masking intermediate values of the digits of the signed multiplication result. The intermediate values of the digits of the signed multiplication result are elements $Z_{i+j}$ in box 86 of FIG. 4.

Preferably, the method further includes: (f) converting the signed multiplication result to a corresponding unsigned multiplication result.

In accordance with the present invention, there is further provided a device for multiplying a first multiplicand by a second multiplicand, the device including: (a) a first register for storing the first multiplicand as a first vector of at least one respective digit, each digit having a pre-determined number of bits; (b) a second register for storing the second multiplicand as a second vector of at least one respective digit, each digit having the pre-determined number of bits; and (c) a processor, all of whose multiplications are limited to signed multiplication, for converting the first vector and the second vector to a corresponding converted first vector and a corresponding converted second vector of at least one respective digit respectively, each digit having one bit less than the pre-determined number of bits, and for multiplying bits of the corresponding converted first vector by bits of the corresponding converted second vector, to generate a signed multiplication result.

Preferably, the processor applies the conversion of the first vector and the second vector in place using the existing first and second resisters. Alternatively, a third storage unit is provided for storing the corresponding converted first vector and the corresponding converted second vector.

Preferably, the processor applies a masking operation for masking intermediate values of the digits of the signed multiplication result.

Additional features and advantages of the invention will become apparent from the following drawings and description.

BRIEF DESCRIPTION OF THE DRAWINGS

For a better understanding of the invention with regard to the embodiment thereof, reference is made to the accompanying drawings, in which like numerals designate corresponding sections or elements throughout, and in which.

DETAILED DESCRIPTION OF THE PREFERRED EMBODIMENTS

The present invention is an innovative device and method performing efficient large-number multiplication using a processor that is limited to signed arithmetic only.

The preferred method of the present invention is carried out in two main phases: Firstly, multipliers represented as W bit words are converted to W−1 bit words, such that the Most Significant Bit is a zero bit. This conversion ensures that the signed bit (MSB) is always 0. Secondly, a long-number multiplication procedure using multiplication algorithms known in the art is performed.

Because the multiplicands are now positive numbers there is no need for applying an extra sequence of arithmetic operations for translating the signed multiplication result into an unsigned result (as required by multiplication techniques known in the art).

Therefore, implementing the method of the present invention for very large multiplicands achieves a significant cost reduction, with comparison to standard multiplication techniques known in the art. Furthermore, the present invention capitalizes on the capability of a DSP to perform addition and multiplication in a single operation, resulting in even higher multiplication performance.

In order to be compatible with other multiplication systems known in the art, converting the W−1 bit word result of the multiplication procedure back into a pre-determined word representation (W bit word herein) is provided by the present invention as optional. Such conversion allows the MSB of at least one output word to be a '1' bit.

Figure 3:
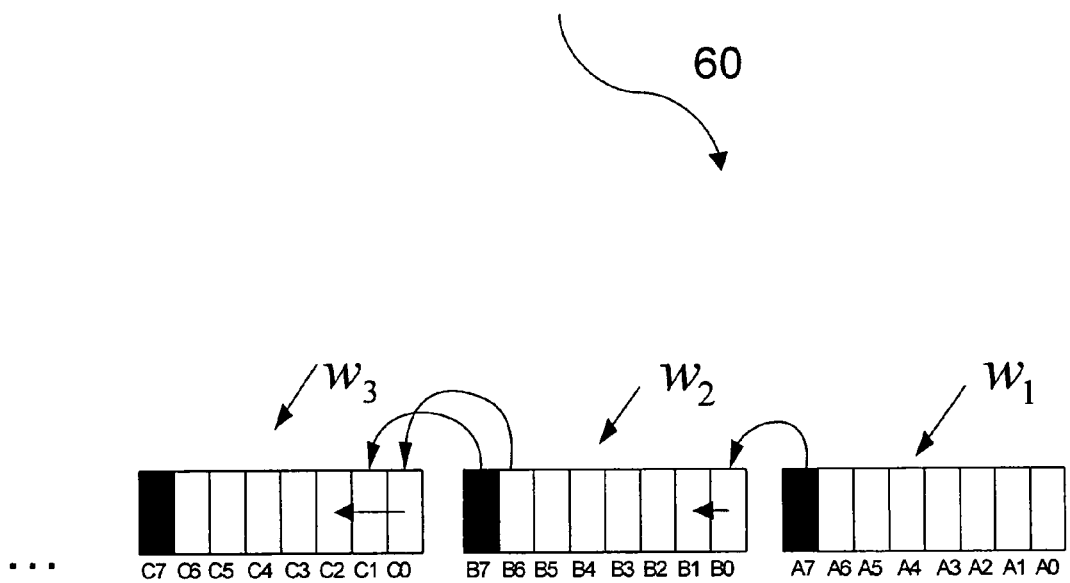
FIG. 3 is a block diagram of a prior art conversion procedure for converting W bit words to W−1 bit words, where W=8 for example.

Referring now to FIG. 3, there is shown a block diagram of a prior art conversion procedure 60 for converting a plurality of W bit words to a plurality of W−1 bit words, where W=8 for example.

The number of words of a multiplicand having n bits is $$\lceil \frac{n}{W} \rceil,$$

where W is the number of bits in each word (e.g. W=8). For example, the 8 bits of a first word $w_1$ are represented by A0 (LSB), A1, A2, A3, A4, A5, A6, and A7 (MSB), the 8 bits of a second word $w_2$ are represented by B0 (LSB), B1, B2, B3, B4, B5, B6, and B7 (MSB). The 8 bits of a third word $w_3$ are represented by C0 (LSB), C1, C2, C3, C4, C5, C6, and C7 (MSB), and so on.

The first operation involves copying the Most Significant Bit (MSB) A7 of the first word $w_1$, which holds the Least Significant Digit (LSD) of the multiplicand, to the Least Significant Bit (LSB) B0 of the second word $w_2$, while bits B0, B1, B2, B3, B4, and B5 of the second word $w_2$ are shifted left one position.

The second operation is applied for the second word $w_2$, but now two most significant bits B6 and B7 are copied to two least significant bits C0 and C1 of the third word $w_3$, while bits C0, C1, C2, C3, and C4 of the third word $w_3$ are shifted left two positions.

After applying similar operations to all $$\lceil \frac{n}{W} \rceil$$

words of a multiplicand, there are generated $$\lceil \frac{n}{W-1} \rceil$$

new converted words, such that each new converted word is represented now with only W−1 bits.

In practice, in case the W-bit to W−1 bit conversion procedure described herein above is done in-place (using a common buffer for example), then these operations are applied from the MSD (Most Significant Digit) to the LSD (Least Significant Digit). For example, in case of the second operation the two most significant bits B6 and B7 are copied to two least significant bits C0 and C1 before bits C0, C1, C2, C3, and C4 of the third word $w_3$ are shifted left two positions.

Figure 4:
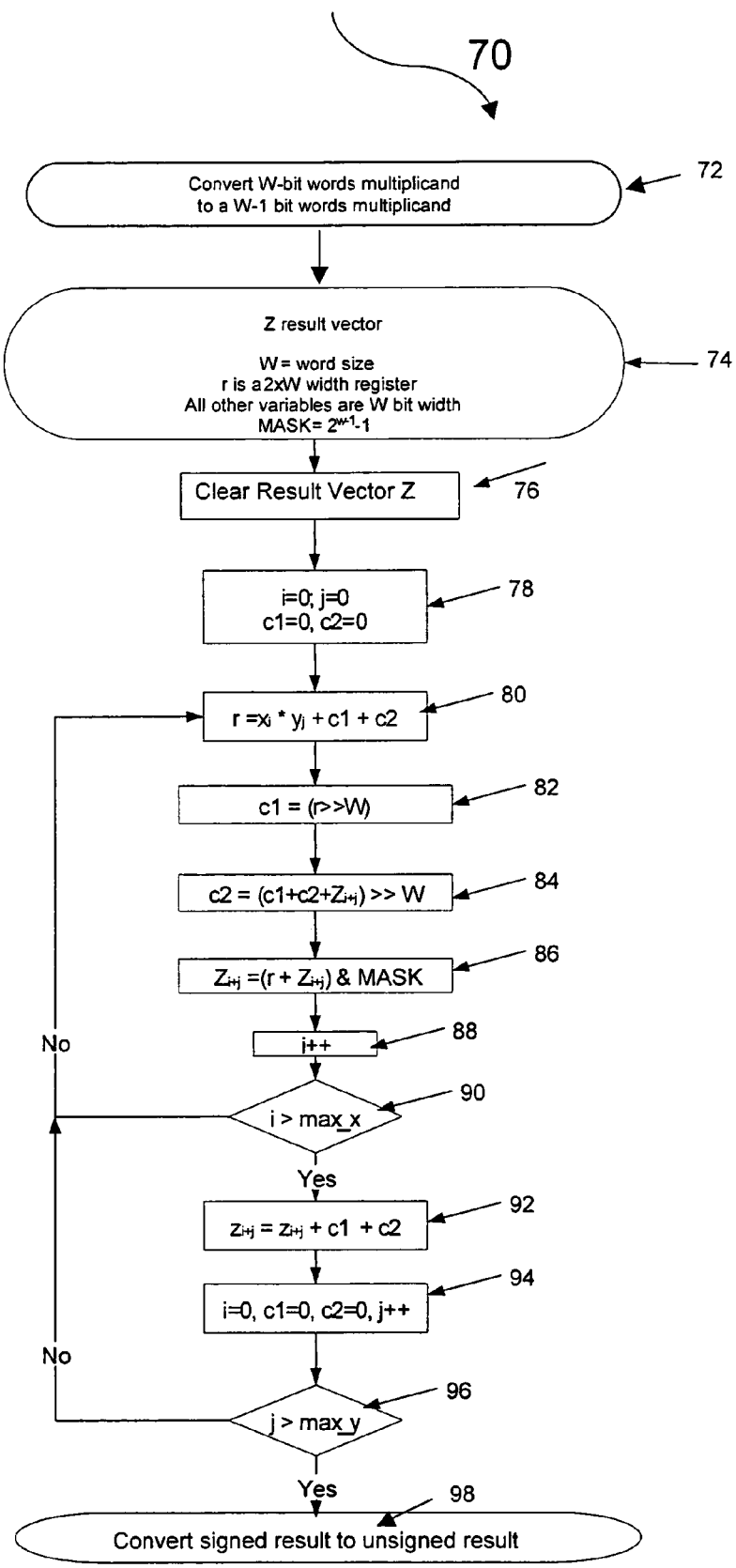
FIG. 4 is a flow chart of the method of the present invention.

Referring to FIG. 4, there is shown a flow chart of the method 70 of the present invention.

At the initial step 72, the conversion procedure 60 of FIG. 3 is carried out to convert the W bit words representation of a multiplicand to W−1 bit words representation. Both input operands X and Y are converted into the new W−1 bit words representation (i.e. each word used to hold the multipliers include W−1 bits). The conversion may employ the same input buffer that holds the input multiplicands in "original" W bit words representation (if enough memory is allocated) or may further employ a separate allocated buffer. The lengths of input vectors X and Y are max_x and max_y, respectively.

max_x and max_y are calculated as follows:

$$\text{max\_x} = \lceil \frac{n_x}{W-1} \rceil \text{ and } \text{max\_y} = \lceil \frac{n_y}{W-1} \rceil,$$

wherein $n_x$ represents the length (i.e. number of bits) of operand X and $n_y$ represents the length (i.e. number of bits) of operand Y.

At the next step 74, a result vector Z for holding the result is provided. A double-width register r (composed of 2×W bits) is used to temporarily hold the multiplication result. The mask of the present invention is defined as $2^{W-1}-1$ (the MSB bit is "0" and all the other bits are "1"). A masking operation is defined herein as the operation of logically ANDing a W-bit word with the mask.

Figure 1:
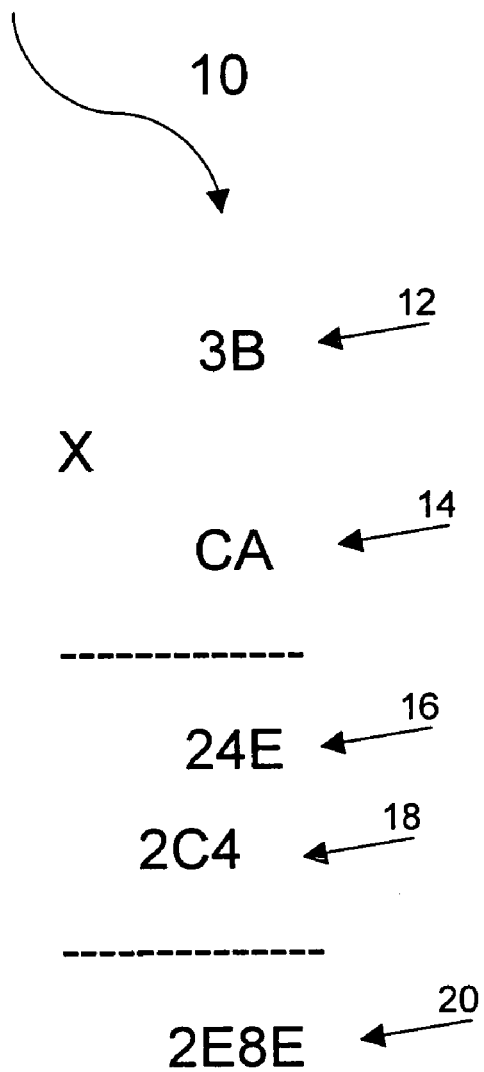
FIG. 1 is a demonstration of a prior art multiplication procedure for multiplying two multiple-digit numbers using pen and paper.
Figure 2:
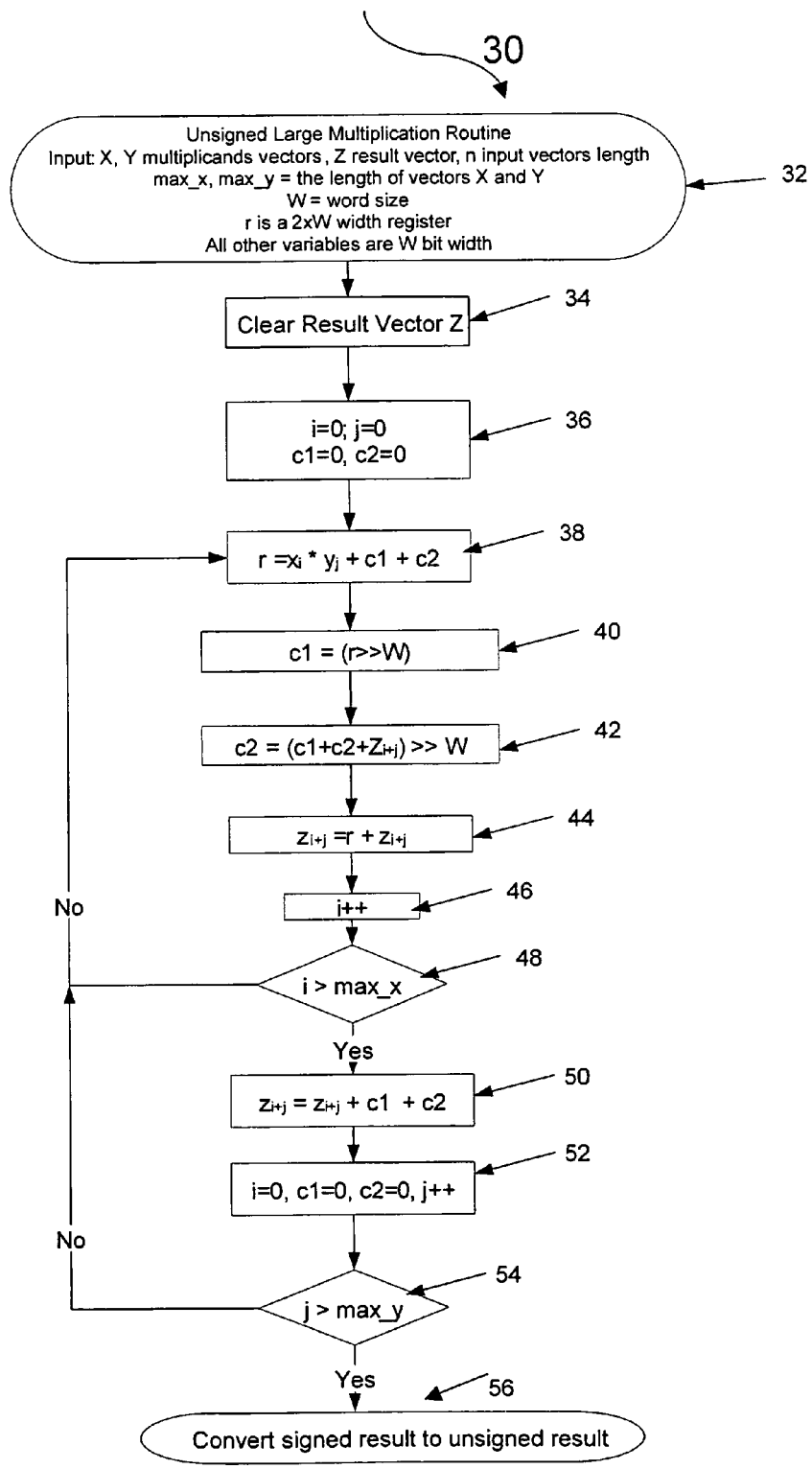
FIG. 2 is a flow chart of a prior art computerized multiplication algorithm applied for the multiplication of the two multiple-word numbers of FIG. 1.

The following steps 76, 78, 80, 82, and 84 are identical to the corresponding steps 34, 36, 38, 40 and 42 of the computerized multiplication algorithm 30 described in FIG. 2.

At step 76, the result vector Z is cleared.

At step 78, the internal variables i, j, c1, and c2 of the two multiplicand vectors X and Y are cleared, wherein i is the first number digit index, j is the second number digit index, c1 is the high word from the previous multiplication operation, and c2 is the carry from the previous addition operation.

Steps 80, 82, 84, 86, 88, and 90 are the main multiplication loop. At step 80, two digits are multiplied, adding the previous multiplication high word c1, and the carry from the previous addition operation c2. The result is temporarily stored in the double-width register r.

At step 82, the result r of the high-word multiplication is stored in c1.

At the next step 84, the addition carry is calculated and stored in c2.

At step 86, the result vector element $z_{i+j}$ is updated by adding to it the multiplication result. Since the width of the result vector element is W, only the lower word of r is added to $z_{i+j}$. A masking operation is then applied on this result vector element $z_{i+j}$. Since the sign bit (MSB) of the result vector element $z_{i+j}$ is irrelevant when performing a signed arithmetic operation, the masking operation (of a W−1 '1'-bit mask) ensures that this sign bit (MSB) of the result vector element $z_{i+j}$ is cleared.

The following steps 88, 90, 92, 94, 96, and 98 are applied in a similar manner as corresponding prior art steps 46, 48, 50, 52, 54, and 56 of FIG. 2.

At step 88, the X multiplicand index i is incremented.

At step 90, it is determined whether the value of i is greater than the length of input vector X. In the affirmative case, the long-number multiplication procedure proceeds to step 92. However, in the negative case, the long-number multiplication procedure returns to apply step 78 for repeating the main multiplication loop.

At step 92, the next result word is updated by adding to it the values of c1 and c2.

At step 94, the second multiplicand index j is incremented, and the internal variables i, c1, and c2 are cleared.

At the next step 96, it is determined whether the internal variable j is greater than the length of input vector Y. In the affirmative case (i.e. after performing max_x times max_y multiplication operations), signed result vector Z holding the final multiplication result is converted to an unsigned result vector. This is applied, for example, using a prior art conversion procedure (e.g. the inverse conversion procedure of FIG. 3) for converting a plurality of W−1 bit words to a plurality of W bit words. However in the negative case, the long-number multiplication procedure restates the internal loop from step 80 by multiplying the first multiplicand with the next word of the second multiplicand.

Figure 5:
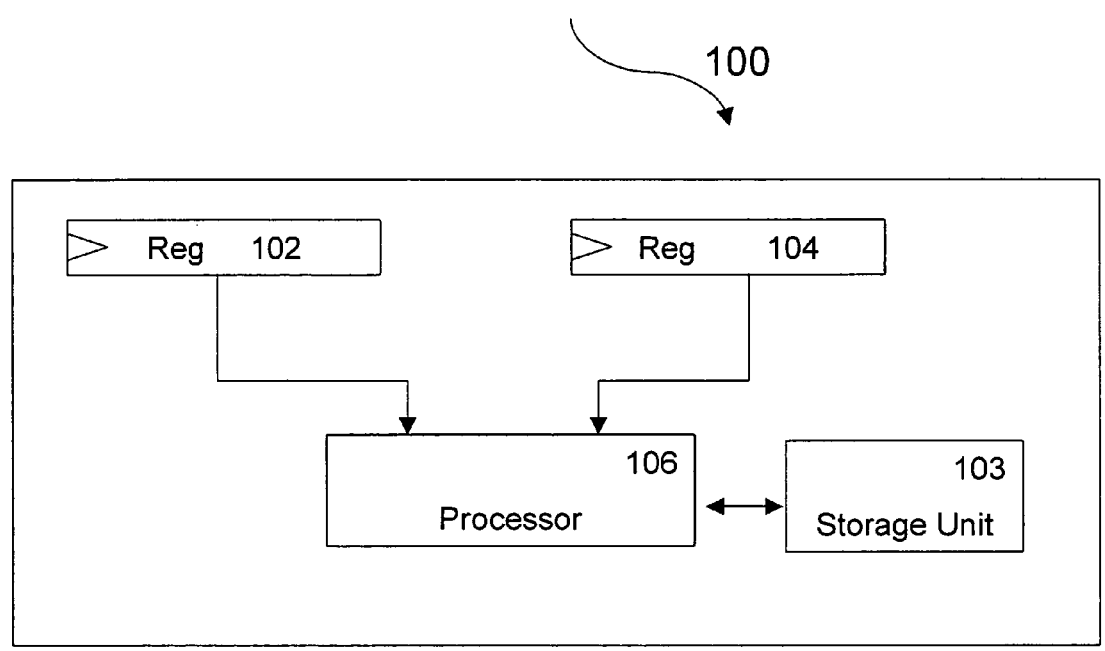
FIG. 5 is a high-level schematic block diagram of a device of the present invention.

Referring to FIG. 5, there is shown a high-level schematic block diagram of a device 100 of the present invention. Register 102 is provided for storing a first multiplicand as a first vector of digits each represented with W bits. Register 104 is provided for storing a second multiplicand as a second vector of digits each represented with W bits.

A processor 106, that is limited to signed multiplication only, converts each of the digits of the first multiplicand and of the second multiplicand to a W−1 bits representation and then multiplies the converted digits of the first multiplicand by the converted digits of the second multiplicand to generate a signed multiplication result.

Preferably, a storage unit 103 (e.g. RAM, register, etc), is provided for storing the converted digits of the first multiplicand and the converted digits of the second multiplicand, respectively. The signed multiplication result generated by processor 106 is also stored in storage unit 103 as words represented with W−1 bits each.

Preferably, processor 106 also converts the signed multiplication result to an unsigned multiplication result and stores this unsigned multiplication result in storage unit 103 as words represented with W bits each.

Alternatively, the conversion of the first multiplicand and of the second multiplicand to a W−1 bits representation can be applied by processor 106 in place (i.e. using register 102 and register 104, respectively).

The present invention is described herein as implemented according to a specific multiplication algorithm. However, it can be understood that other implementations are possible within the scope of the invention, thus relating to any method and device which converts each W bit word of a multiplicand to a W−1 bit word before performing efficient large-number multiplication.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. An unsigned multiplication method for multiplying a first multiplicand with a second multiplicand, the method comprising:
    (a) storing in a first register the first multiplicand as a first vector of at least one respective digit, each digit having a pre-determined number of bits;
    (b) storing in a second register the second multiplicand as a second vector of at least one respective digit, each digit having the pre-determined number of bits;
    (c) converting the digits of the first vector to corresponding digits of one bit less than the pre-determined number of bits each;
    (d) converting the digits of the second vector to corresponding digits of one bit less than the pre-determined number of bits each; and
    (e) generating a signed multiplication result, using a processor, all of whose multiplications are limited to signed multiplication, by multiplying each converted digit that corresponds to the first multiplicand by each converted digit that corresponds to the second multiplicand.

2. The method of claim 1, wherein the signed multiplication result includes a plurality of digits and wherein the generating includes masking intermediate values of the plurality of digits of the signed multiplication result.

3. The method of claim 1 further comprising: (f) converting the signed multiplication result to a corresponding unsigned multiplication result.

4. The method of claim 1, wherein each digit of the first vector is represented by a respective at least one word having the pre-determined number of bits, each digit of the second vector being represented by a respective at least one word having the pre-determined number of bits, and wherein the converting results in a most significant bit of the at least one word of the converted first and second vectors being a zero bit.

5. A device for multiplying a first multiplicand by a second multiplicand, the device comprising:
    (a) a first register for storing the first multiplicand as a first vector of at least one respective digit, each digit having a pre-determined number of bits;
    (b) a second register for storing the second multiplicand as a second vector of at least one respective digit, each digit having the pre-determined number of bits; and (c) a processor, all of whose multiplications are limited to signed multiplication, for converting the first vector and the second vector to a corresponding converted first vector and a corresponding converted second vector of at least one respective digit respectively, each digit having one bit less than the pre-determined number of bits, and for multiplying bits of the corresponding converted first vector by bits of the corresponding converted second vector, to generate a signed multiplication result.

6. The device of claim 5, wherein the processor applies the conversion of the first vector and the second vector in place.

7. The device of claim 5 further comprising: (d) a storage unit for storing the corresponding converted first vector and the corresponding converted second vector.

8. The device of claim 5, wherein the signed multiplication result includes a plurality of digits and wherein the processor applies a masking operation for masking intermediate values of the digits of the signed multiplication result.

9. The device of claim 5, wherein each digit of the first vector is represented by a respective at least one word having the pre-determined number of bits, each digit of the second vector being represented by a respective at least one word having the pre-determined number of bits, and wherein the converting results in a most significant bit of the at least one word of the converted first and second vectors being a zero bit.

* * * * *